E. HUMPHREY.
SAW.

No. 74,541. Patented Feb. 18, 1868.

Attest:
Charles E. Smith
D. W. G. Humphrey

Inventor:
Eugene Humphrey

United States Patent Office

EUGENE HUMPHREY, OF BOSTON, MASSACHUSETTS.

Letters Patent No. 74,541, dated February 18, 1868.

IMPROVEMENT IN SAWS.

The Schedule referred to in these Letters Patent and making part of the same.

TO ALL WHOM IT MAY CONCERN:

Be it known that I, EUGENE HUMPHREY, of Boston, in the county of Suffolk, and Commonwealth of Massachusetts, have invented a new and improved Mode of Securing Movable or Insertable and Self-Adjusting Saw-Teeth in their Recesses in the Saw-Plate; and I do hereby declare that the following is a full, clear, and exact description thereof, which will enable others to make and use my invention, reference being had to the accompanying drawings and letters of reference marked thereon, which form a part of this specification.

In said drawings are shown sections of a circular saw-plate, in which are inserted one form of insertable and self-adjusting saw-teeth, to which my invention is specially adapted, and which tooth was invented and patented by Joseph W. Strange, of Bangor, Maine, August 13, 1867, and is designed, by its peculiar form, in combination with its recess in the saw-plate, to be self-fastening, by being wedged in its plate "by the collision of the cutting-edges of the tooth with the lumber to be sawed." This tooth is secured from being knocked out by a sidewise blow by having its recess and curved bottom bevelled, but is removable by a slight blow upon its back, which will throw it out of its plate. It seems to me possible that such a removal of the tooth may occur when the saw is in use by some of the accidents incident to sawing lumber; and to prevent such a mishap is the object of my safety-slide or fastening, when applied to said tooth.

It is found, by practical experience, to be very desirable that a movable, insertable, or adjustable saw-tooth should be so constructed and inserted in its plate as to keep itself, when in use, firmly fixed in its recess in the plate, adjusting itself thereto in case of any wear, and thus diminish the wear by preventing looseness of the tooth. The form and operation of the tooth shown seem peculiarly adapted to accomplish this desirable result. It follows, therefore, from these considerations of the proper construction of an adjustable tooth, that any device for securing such a tooth in its plate, when in use, should be such that, while it effects the desired security of the tooth in its plate, it will not, at the same time, interfere with its firmly adjusting itself in its recess by collision with the lumber sawed.

Figure 1:
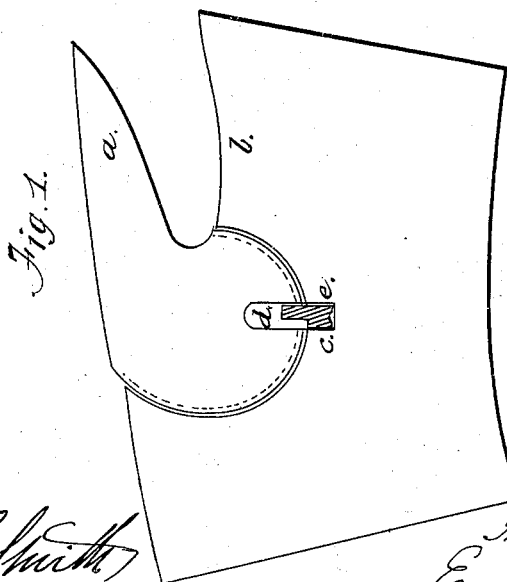

Figure 1 represents a section of a circular saw-plate, with a tooth, such as has been referred to, secured therein, by means of one form of my new and improved mode of fastening, which consists, in this case, of a slide, $c$, of unequal width, working in recesses in the tooth $a$ and plate $b$, of equal or uniform width throughout, said slide having grooved sides, fitted to work in the uniform recesses, $d$ and $e$, in the tooth $a$ and plate $b$, which recesses have bevelled sides, fitted to said grooves in the sides of the slide $c$.

When it is desired to remove the tooth $a$ from the plate $b$, the slide $c$ is pushed wholly into the recess $d$ in the tooth $a$, when, by a slight blow upon the back of said tooth in the direction of the plate $b$, the tooth is turned in its recess in the plate, and released therefrom; but, when it is desired to secure the tooth $a$ in its proper working position in the plate, the tooth is placed in such position, and then the slide $c$ is pushed partially out of the recess $d$ in the tooth into the recess $e$ in the plate, as shown in the drawing, thus effecting, by this position of the slide $c$, in connection with the recesses $d$ and $e$, the desired security of the tooth in the saw-plate. At the same time, the tooth is left free to strain up and adjust itself tightly in its recess in the plate by collision with the lumber sawed, by reason of the change in the width of the slide $c$ above the line of separation of the tooth and plate, which essential result would be defeated were the said slide $c$ of a uniform width throughout its whole length.

Figure 2:
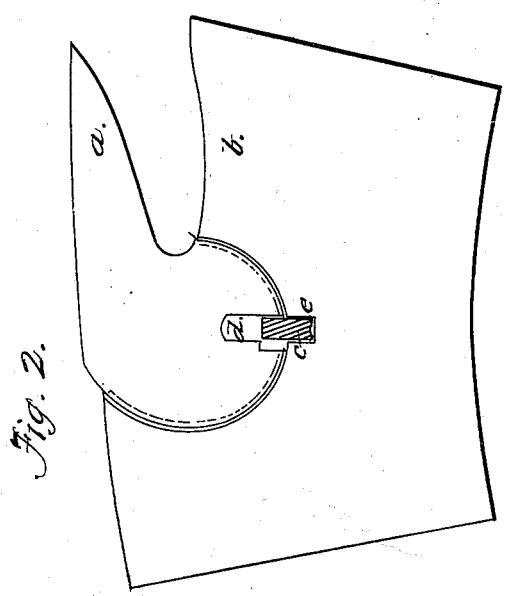

Figure 2 represents a section of a circular-saw plate, with a like tooth inserted therein, and secured in the plate by means of another form of my new mode of fastening, which consists, in this case, of a slide, $c$, of equal width throughout its length, working in substantially the same manner as the slide in fig. 1, but in recesses in the plate and tooth not of uniform and equal width throughout, thus effecting, by a change of width in the recess $d$ in the tooth $a$, as shown in the drawing, substantially the same desired result of securing the tooth from accidental turning in its plate in the direction which would release it therefrom, and, at the same time, leaving it free to strain up tight in its plate by collision with the lumber sawed. It is obvious that the same result may be also attained by cutting away or varying the width of both the recess and slide, without materially deviating from the principle of my invention.

What I claim, and desire to secure by Letters Patent, is—

The fastening of a movable or insertable and self-adjusting saw-tooth in its recess in the saw-plate by means of a slide operating in combination with a recess extending into the plate and tooth, substantially as described, when said slide or recess, or both, are cut away or varied in width, for the purpose described.

EUGENE HUMPHREY.

Witnesses:
CHARLES E. SMITH,
D. W. G. HUMPHREY.